United States Patent
Fink

[15] 3,685,131
[45] Aug. 22, 1972

[54] METHOD OF INSTALLING INSERT RING IN PIPE UNIONS

[72] Inventor: Frank J. Fink, Chardon, Ohio

[73] Assignee: The Imperial Manufacturing and Engineering Company, Middlefield, Ohio

[22] Filed: May 11, 1970

[21] Appl. No.: 36,278

[52] U.S. Cl. ............. 29/417, 29/432, 29/509, 29/523, 29/156.7 A, 285/334.1
[51] Int. Cl. ............................................. B23p 17/00
[58] Field of Search ........ 277/170, 172; 29/523, 509, 29/522, 432, 156.7 A, 417; 285/332.2, 334.1

[56] References Cited

UNITED STATES PATENTS

| | | | |
|---|---|---|---|
| 1,959,068 | 5/1934 | Stoll | 29/156.7 A |
| 2,017,154 | 10/1935 | Larkin | 29/156.7 A UX |
| 2,332,355 | 10/1943 | Stecher | 285/334.1 X |
| 1,523,817 | 1/1925 | Long | 277/170 |
| 1,905,115 | 4/1933 | Lofgren | 277/172 |
| 3,116,067 | 12/1963 | Kinzie et al. | 277/170 |
| 3,150,889 | 9/1964 | Watts | 277/170 X |

FOREIGN PATENTS OR APPLICATIONS

| 1,185,876 | 1/1965 | Germany | 277/236 |
|---|---|---|---|

*Primary Examiner*—Charlie T. Moon
*Attorney*—McNenny, Farrington, Pearne and Gordon

[57] ABSTRACT

A pipe union or the like including a body portion having a sealing ring insert positioned in a recess provided by the body and a method of forming and installing the ring insert are disclosed. According to the method, the sealing ring is formed to provide a work-hardened sealing and interlocking portion which extends about the entire periphery of the ring. The sealing ring is forged into the recess, embedding and sealing the interlocking portion in the side wall of the recess and intimately contacting the adjacent ring and recess walls to provide a fluid-tight seal and mechanically interlock the ring within the recess.

4 Claims, 5 Drawing Figures

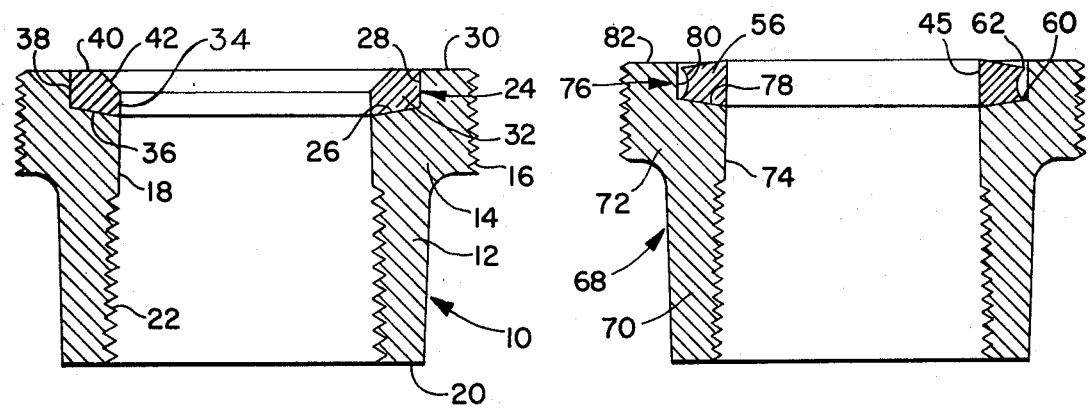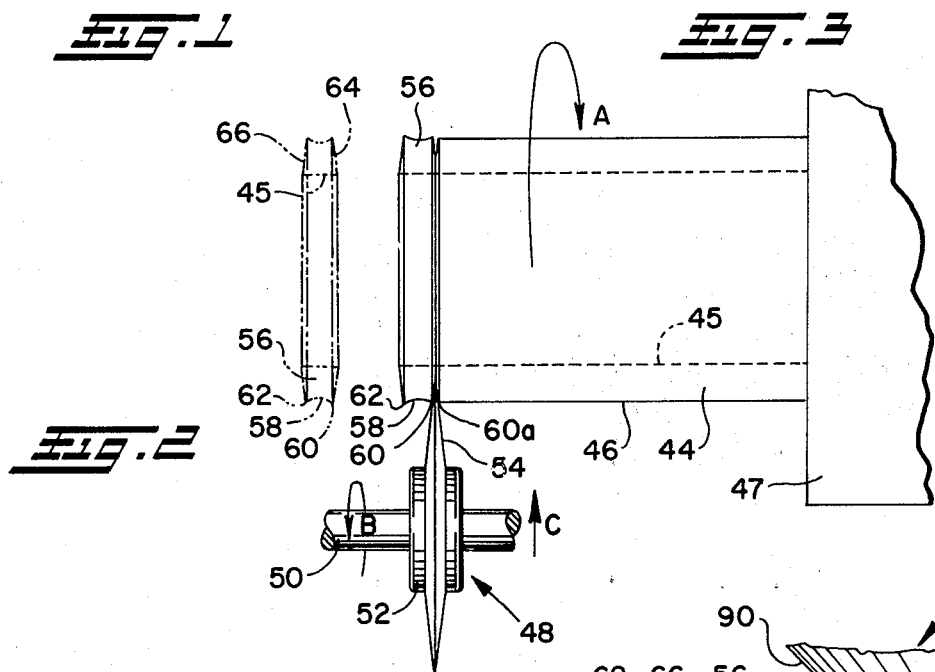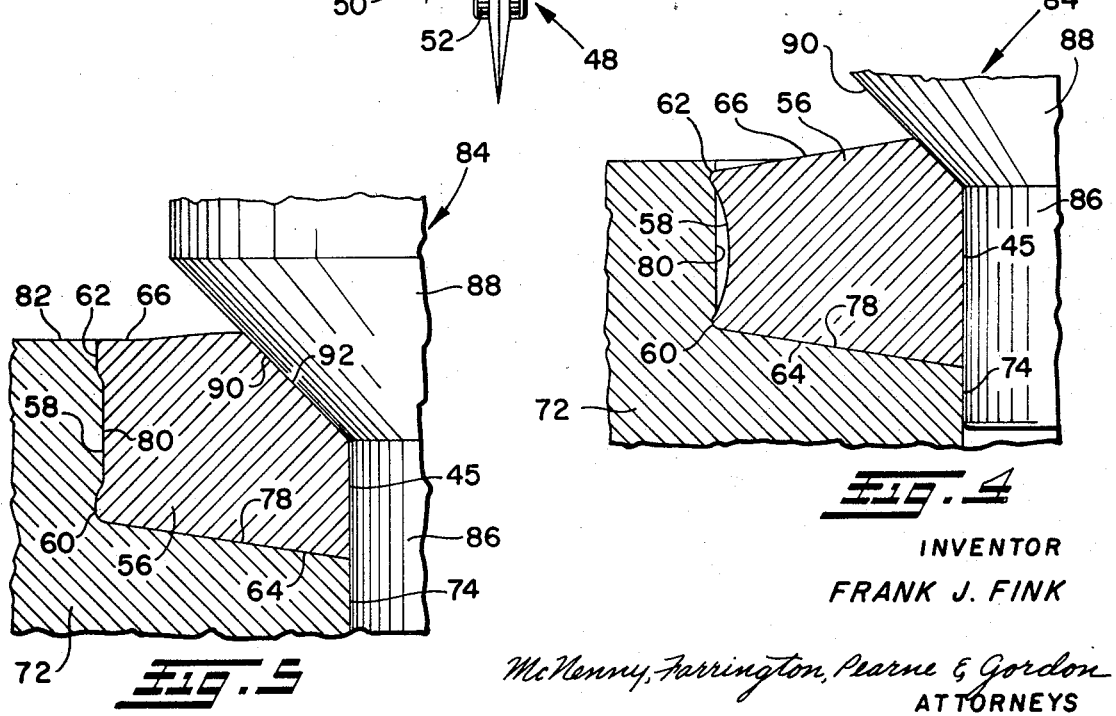
INVENTOR
FRANK J. FINK
McHenny, Farrington, Pearne & Gordon
ATTORNEYS

METHOD OF INSTALLING INSERT RING IN PIPE UNIONS

FIELD OF THE INVENTION

This invention relates generally to pipe unions or the like having sealing ring inserts and a method of forming and installing such ring inserts. More particularly, a novel and improved sealing ring insert is disclosed having a work-hardened portion which tends to embed in the body of the pipe union when the ring is forged into the pipe union according to the method of the present invention.

Although the present invention relates generally to pipe unions or similar pipe connecting fixtures having sealing ring inserts, and should not otherwise be limited, it will be discussed hereinafter with particular reference to pipe unions.

PRIOR ART

Sealing rings for pipe unions as disclosed by the prior art are typically formed of a substantially non-corrosive, softer material than the material used to form the pipe union body. For example, the pipe union body is usually formed of a ferrous metal and the sealing ring is formed of a softer metal, such as brass. Such sealing rings are generally formed by machining or casting operations. In some instances, such rings are formed to fit the recess with an interference fit. In other instances, cast rings are shaped to fit with clearance into an annular recess provided by the pipe union body. Such cast rings are forged or pressed into the recess, intimately contacting the adjacent walls of the ring and the recess, to provide a fluid-tight seal therebetween.

The only patent of which I am aware relating to the forging of sealing rings in such unions is the U.S. Pat. No. to Lofgren No. 1,905,115.

The prior art pipe unions having sealing rings as generally described above are not entirely satisfactory for a number of reasons. Initially, it may be noted that sealing rings prepared by a machining process are relatively expensive to manufacture.

Although sealing rings produced by a casting operation are somewhat less expensive than machined rings, the cast rings have other disadvantages. For example, the casting operation results in a casting gate projecting from one end wall of the ring structure which is not uniform in size and which can produce problems in automated feeding and pressing operations. Also, unless the ring is machined to smooth its outer surface before being pressed in place, roughness can produce a leakage path unless very high forging pressures are used.

In addition, once the cast sealing ring has been properly forged or pressed into the recess, the exposed ring surface must be machined to provide a good surface finish.

SUMMARY OF THE INVENTION

The present invention provides a pipe union having a body formed of a relatively hard metal and a sealing ring insert forged within a recess provided by the harder body. The sealing ring insert includes a work-hardened sealing and interlocking portion extending about the entire periphery of the ring which provides a zone of high interfacial contact pressure which prevents leakage. Such work-hardened portion also tends to embed in the adjacent sidewall of the recess as the ring is forged into intimate contact with the adjacent walls of the recess to mechanically interlock the parts.

According to the preferred method of the present invention, a sealing ring is formed without scrap by sequentially cutting rings from the end of a tubular member with a cutting wheel so as to progressively cut the tubular member inwardly from its exterior surface. Therefore, the sealing ring is simultaneously cut to shape and axially deformed to provide a work-hardened portion extending around its periphery. The rings are then positioned with clearance in a recess in the body and are upset by axial pressure. This causes the work-hardened portions to press radially into the body to form a mechanical interlock and a continuous zone of high pressure which provides a positive seal. After the ring has been forged into the recess, the interlocking portion tends to have a greater radius than the adjacent portions of the body, and therefore the ring is compressively stressed by the body with a greater pressure of engagement, since the body provides greater spring-back than the sealing ring. Thus, the sealing ring of the present invention provides a superior fluidtight seal and mounting, as compared to prior art sealing rings.

In contrast to the prior art techniques of forming sealing rings, the method of the present invention is relatively inexpensive and easily performed. Specifically, the expensive machining procedures are eliminated, and there are no irregular casting gates which must be subsequently removed.

In addition, a sealing ring manufactured according to the method of this invention lends itself to automatic feeding operations, since it is symmetrically formed. In particular, after the first cut, each ring is formed with a radially extending portion positioned adjacent to each of the end walls of the ring. Therefore, the ring is inserted into the recess of the body with either of its end walls exposed or adjacent to the forging tool.

These advantages and others will appear in the following description and drawings.

BRIEF DESCRIPTION OF THE DRAWINGS

FIG. 1 is a sectional view of a pipe union incorporating a sealing ring according to the present invention;

FIG. 2 is a side elevation illustrating a preferred apparatus for forming a sealing ring according to the method of the present invention;

FIG. 3 is a sectional view of a pipe union and sealing ring before the sealing ring is forged into place;

FIG. 4 is a fragmentary, sectional view on an enlarged scale of the pipe union and sealing ring shown in FIG. 3, and a forging tool at an intermediate point in the forging stroke, with parts broken away for clarity; and FIG. 5 is a fragmentary, sectional view similar to Fig. 4, illustrating the forging tool at the end of the forging stroke.

DETAILED DESCRIPTION OF THE DRAWINGS

Referring to FIG. 1, there is illustrated a pipe union 10 having a body portion 12. The body portion 12 is usually formed of a relatively hard, ferrous metal casting. The body 12 includes an enlarged diameter head portion 14 having external threads 16 about its periphery. The body 12 is also provided with an axially extending bore 18. The bore 18 extends to an annular end face 20 adjacent the lower end of the body 12, as shown in FIG. 1, and it is provided with internal threads 22 extending from the end face 20.

As shown in FIG. 1, the body 12 is provided with a recess 24 adjacent the upper end of the bore 18. The recess 24 includes a radially extending end wall 26 and a cylindrical sidewall 28. The recess 24 extends to an annular end face 30 adjacent the upper end of the body 12, as shown in FIG. 1.

A sealing ring insert 32 is positioned within the annular recess 24. The sealing ring 32 has an axially extending bore 34 having a diameter substantially equal to the diameter of the bore 18. The sealing ring includes an end wall 36 and a sidewall 38 which are intimately contacted with the end wall 26 and the sidewall 28, respectively, of the recess 24 so as to form a fluid-tight seal. The sealing ring 32 is compressively stressed radially by the body 12 and portions of the sidewall 38 are embedded in the recess sidewall 28 as described in detail below.

The exposed end face 40 of the ring 32 is substantially coplanar with the end face 30 of the body 12. A flared sealing surface 42 is provided about the bore 34 adjacent the end face 40 of the sealing ring.

Referring to FIG. 2, there is illustrated a preferred apparatus for forming sealing rings according to the method of the present invention. As there shown, a tubular member 44 having a suitable bore or inner diameter 45 and outer diameter 46 is retained and rotated, in the direction shown by the arrow A, by a chuck 47. A portion of a cutting tool 48 is shown positioned adjacent one end of the tubular member 44.

The cutting tool 48 includes a central axle 50 and a circular cutting wheel 52 mounted thereon which rotates in the direction indicated by the arrow B. The cutting wheel 52 is provided with a conical cutting edge 54 adjacent its outer periphery.

The cutting tool 48 is supported by any suitable structure (not shown) for radial movement in the direction of the arrow C towards the tubular member 44. Therefore, as the tubular member 44 and the cutting wheel 52 are counter-rotated, the cutting tool 48 is progressively advanced to sever the tubular member uniformly from its outside diameter 46 inwardly to its inner diameter or bore 45.

As illustrated in FIG. 2, a sealing ring 56 is partially severed from the left end of the tubular member 44. As the cutting tool 48 is progressively advanced towards the rotating tubular member, the conical cutting edge 54 cuts into the tubular member and axially deforms the sidewall thereof. Therefore, the sidewall 58 of the ring 56 is provided with a concave configuration and a radially projecting portion 60 extending about the entire periphery of the ring and the end of the tubular member 44 adjacent the cutting wheel 52 is provided with a radial projection 60 a. A similar radially projecting portion 62 is located adjacent the opposite end of the ring 56, the radial projection 62 being formed by a prior cutting stroke of the cutting tool.

In the drawings the amount of concavity and the height of the projecting portions 60 and 62 is greatly exaggerated for purposes of illustration. When the rings are cut from annealed stock the projections are not very high and they are somewhat rounded. When the rings are cut from harder stock they tend to have a shape more closely approaching the illustrated shape. In both cases, however, the rings have zones at 60 and 62 which are harder because of work-hardening. The radial projections so formed are useful in sealing and interlocking the sealing ring in the recess provided by the body of a pipe union, as set forth in detail below.

As shown in phantom outline, the sealing ring 56 has a symmetrical configuration after it has been completely severed from the tubular member. In particular, the sealing ring includes conical or radially extending end walls 64 and 66 which are inwardly flared as a result of the cutting operation. The end walls 64 and 66 radially extend from the projecting portions 60 and 62, respectively, to the axially extending bore 45.

Referring to FIG. 3, the pipe union 68 having a body 70 identical to that illustrated in FIG. 1 is there shown. The body 70 has an enlarged head portion 72 and an axially extending bore 74. Adjacent the enlarged head portion 72 an annular recess 76 is provided about the bore 74. The recess 76 provides a conical, radially extending end wall 78 and a cylindrical sidewall 80. The body 70 includes an annular end face 82 adjacent the head portion 72.

The completely severed sealing ring 56 is shown inserted within the recess 76. As illustrated, the conical end wall 78 of the recess is shaped so as to mate with the end wall 64 of the ring 56. The ring 56 fits with clearance into the recess 76 and the axial bore 74 of the body is aligned with the axial bore 45 of the ring. In the illustrated embodiment shown in FIG. 3, the radially projecting portions 62 and 60 are adjacent the side wall 80 of the recess.

Referring to FIG. 4, an intermediate stage in the forging stroke is illustrated. As shown, a forging tool 84 having a forward cylindrical portion 86 and a rearward conical portion 88 is employed to forge the ring into the recess. The cylindrical portion 86 has a diameter substantially equal to the diameter of the bores 45 and 74. Thus, the cylindrical portion 86 of the forging tool is initially introduced coaxially into the bores without upsetting the ring so as to assure proper alignment and seating of the ring. However, as the forging stroke continues, the conical shoulder 90 of the forging tool commences to deform the ring.

The work-hardened, radially projecting portions or zones 60 and 62 provide the initial contact with the sidewall 80 of the recess, and as the forging processes they are pressed with increased pressure against the sidewall 80 of the recesses. This tends to cause embedding of the edges 60 and 62 to occur even though the material of the body is harder than the general hardness of the seal because of the localized hardness of the edges at 60 and 62 and because of the high localized pressure. As shown in FIGS. 4 and 5, the portions 60 and 62 of the sealing ring are embedded in the sidewall 80 of the recess as the ring is forged in place. Here again, the amount of embedding is exaggerated for purposes of illustration. In contrast to prior art sealing rings, which are merely tightly pressed against the adjacent walls of the body, portions of the sealing ring of the work-hardened zones engage the walls of the recess with high localized pressure and thereby provide two spaced sealing zones.

Referring to FIG. 5, the forging tool 84 is illustrated at the end of its forging stroke. The sealing ring 56 has been deformed to intimately contact the sidewalls 58 and 80 and the end walls 64 and 78 of the ring and the recess. In addition, the radially projecting portions 60 and 62 of the sealing ring have been effectively embedded in the sidewall 80 of the recess so as to provide a sealing and interlocking structure identical to that described with respect to the sealing ring 32 illustrated in FIG. 1.

As the ring 56 is forged in place, the ring and portions of the enlarged head 72 of the body 70 adjacent to the ring are radially expanded. Since the ferrous metal of the body 70 has more spring-back than the brass of the seal, the body maintains a compressive stress on the ring and securely locks it in place, insuring a tight seal.

The forging operation provides the sealing and interlocking portions 60 and 62 with greater radii than the adjacent portions of the body 70. Therefore, the seal is mechanically locked in place. It is not necessary that both of the radial projections lie adjacent to the sidewall, since one of the radial projections will provide effective sealing and interlocking when the ring is forged into place.

As shown in FIGS. 4 and 5, the conical shoulder 90 of the forging tool 84 deforms the sealing ring 56 about the bore 45 to provide a conical surface 92. In some instances, further machining is performed to finish the sealing surface 92 and the end wall 66. However, this does not have to be done since the surface 66 is substantially coplanar with the end face 82 of the body and the surface 92 is sufficiently smooth to function as the seal.

Although a preferred embodiment of this invention is illustrated, it is to be understood that various modifications and rearrangements may be resorted to without departing from the scope of the invention disclosed.

What is claimed is:

1. A method of forming a pipe union or the like, including a body having an axially extending bore therethrough and a work-hardening metal ring insert positioned within a recess having a cylindrical sidewall and a radially extending end wall adjacent one end of said bore comprising forming a ring proportioned to fit into said recess provided with a substantially smooth annular work-hardened zone extending completely therearound, forging said ring with a tool having a conical shoulder, and radially deforming said ring by axially moving said tool against said ring causing said zone to uniformly engage said sidewall with a maximum pressure extending uniformly therearound to provide an interlocking and sealing connection between said ring and said body which extends completely around said ring and producing a conical surface adjacent to one end face of said ring.

2. A method as set forth in claim 1, wherein said work-hardened zone is formed by deforming the material of said ring causing said zone to project radially of said ring.

3. A method of forming a pipe union or the like as set forth in claim 2, wherein the step of forming said ring includes cutting a tubular member by advancing a cutting wheel radially in against said member from the outside surface to simultaneously separate said ring from said member and axially deform the material of said ring and produce said projection at said outer surface.

4. A method of forming a pipe union or the like as set forth in claim 3, wherein the rings are sequentially cut from said tubular member and projections are formed adjacent to each end.

* * * * *